(12) United States Patent
Schetelig et al.

(10) Patent No.: US 7,646,831 B2
(45) Date of Patent: Jan. 12, 2010

(54) METHOD AND A DEVICE FOR CONTROLLING DATA EXTRACTION FROM A DATA STREAM CONTAINING AT LEASE ONE DATA PACKET

(75) Inventors: Markus Schetelig, Waltrop (DE); Harald Kafemann, Haltern (DE)

(73) Assignee: Nokia Corporation, Espoo (FI)

( * ) Notice: Subject to any disclaimer, the term of this patent is extended or adjusted under 35 U.S.C. 154(b) by 626 days.

(21) Appl. No.: 09/981,795

(22) Filed: Oct. 19, 2001

(65) Prior Publication Data

US 2003/0076905 A1    Apr. 24, 2003

(51) Int. Cl.
*H04D 1/00*    (2006.01)

(52) U.S. Cl. ............... 375/343; 375/149; 375/369; 370/203; 370/206; 370/342

(58) Field of Classification Search ............ 375/343, 375/356, 357, 317, 139, 142, 134, 342, 228, 375/260, 267, 232, 229, 368, 149; 370/509, 370/347, 500, 328, 203, 206, 342
See application file for complete search history.

(56) References Cited

U.S. PATENT DOCUMENTS

| | | | | | |
|---|---|---|---|---|---|
| 5,278,862 | A | * | 1/1994 | Mey ........................... | 375/139 |
| 5,359,625 | A | * | 10/1994 | Mey et al. .................. | 375/142 |
| 5,504,774 | A | * | 4/1996 | Takai et al. ................ | 375/134 |
| 5,619,542 | A | * | 4/1997 | Gurney et al. ............. | 375/371 |
| 6,047,004 | A | * | 4/2000 | Koyama ..................... | 370/509 |
| 6,055,119 | A | * | 4/2000 | Lee ............................ | 360/51 |
| 6,445,423 | B1 | * | 9/2002 | Bouillet et al. ............ | 348/537 |
| 6,463,049 | B1 | * | 10/2002 | Abe et al. .................. | 370/347 |
| 6,587,500 | B1 | * | 7/2003 | Persson et al. ............. | 375/142 |
| 6,768,729 | B1 | * | 7/2004 | Ohsuge ...................... | 370/342 |
| 2003/0026201 | A1 | * | 2/2003 | Arnesen ..................... | 370/210 |

FOREIGN PATENT DOCUMENTS

| | | | |
|---|---|---|---|
| EP | 989685 | A2 * | 3/2000 |
| EP | 1 067 785 | A2 | 10/2001 |
| WO | 00/18150 | | 3/2000 |
| WO | 0145315 | A1 | 6/2001 |
| WO | 0233878 | A2 | 4/2002 |

OTHER PUBLICATIONS

Cheol-Hee Park, et al. International Conference of Consumer Electronics, vol. 46, No. 3, Jun. 13-15, 2000, pp. 682-689.
Binary Pattern Correlator Megafunction, Apr. 1997, pp. 1-4, Altera Corporation, USA.

* cited by examiner

*Primary Examiner*—Chieh M Fan
*Assistant Examiner*—Eva Y Puente
(74) *Attorney, Agent, or Firm*—Banner & Witcoff, Ltd.

(57) ABSTRACT

The present invention relates to a method and a device for data extraction from a data stream containing at least one data packet. First, comparing a bit stream derived from a received digital data stream with an expected bit sequence is performed by packet detector to determine a correlation value (CorrVal) for detecting a data packet. Then, a data extraction unit is started for data extraction when the correlation value (CorrVal) exceeds a threshold value (CorrThres) indicating that a data packet has been detected. Therefore, comparing the received bit stream with the expected bit sequence to determine a new correlation value (CorrVal) is continued by the packet detector. Finally, restarting data extraction is initiated by a sync-control module when the new correlation value (CorrVal) exceeds the form correlation value (MaxCorrVal).

17 Claims, 3 Drawing Sheets

METHOD AND A DEVICE FOR CONTROLLING DATA EXTRACTION FROM A DATA STREAM CONTAINING AT LEASE ONE DATA PACKET

CROSS REFERENCE TO RELATED APPLICATION

The present application is related to application Ser. No. 09/981,903, filed Oct. 19, 2001, entitled "METHOD AND DEVICE FOR IDENTIFYING A DATA PACKET IN A DATA STREAM", by M. Schetelig et al.

BACKGROUND OF THE INVENTION

The present invention relates to a method and a device for data extraction from a data stream containing at least one data packet, in particular for use in a receiver of a wireless digital communication system.

In TDMA based wireless digital communication systems, like Bluetooth, data is transmitted over an air interface in separate packets with well-defined structure. Data is transmitted in a data stream containing a plurality of data packets. Before a receiver can extract the wanted data out of these packets, it has to perform different processing steps.

Signal parameters have to be estimated and appropriate compensation for them has to be done. A synchronization unit, that will be described below, is responsible for the initialization and data extraction in a Bluetooth receiver. Bluetooth is a global standard for wireless, short-range, low-power, low-cost data communication. On the physical layer a binary, gaussian shaped frequency modulation with low modulation index is used.

FIG. 1 shows an example of the receiving chain of a wireless TDMA receiver. After down-conversion of the carrier frequency to an intermediate frequency IF by a mixer 10, channel selection is done with a channel filter 11. Then after demodulating the waveform in a demodulator 12, the waveform (shown In FIG. 2 (*a*) as wavy line W) is transferred into a digital representation (shown in FIG. 2 (*a*) as X-es DW) by an AD converter 13. As a consequence a synchronization unit 14, that receives the digital representation of the received waveform, that is the digitized demodulated waveform of the received signal at its input, can be fully digital. At its output, that is connected to a link controller 15, it provides the extracted bits of the received data packets for further processing on higher layers.

In order to enable data extraction different tasks have to be performed by the synchronization unit 14.

The bits of a data packet are transmitted over an air Interface 9, that is represented by an antenna in FIG. 1, in a sequence of binary FM-modulated symbols. Thus, each symbol represents a received bit. After the FM-demodulation, the synchronization unit 14 has to process these symbols as the symbols arrive at the synchronization unit 14 with an unknown timing and unknown DC level.

However, for data extraction unknown parameters have to be estimated. The DC level resulting from TX and LO offsets as well as from demodulator 12 deviations can be a few times the amplitude of the waveform itself. Under certain conditions, for example the first connection setup, the timing is totally unknown. For successive packets there is at least a timing uncertainty of ±10 symbols.

Before data extraction can be started an appropriate initialization for the applied algorithms is required.

First of all the presence of a packet has to be detected. When a packet has been detected, the accurate symbol timing needs to be determined. Also a DC estimate needs to be available when data extraction starts.

Data extraction requires that for each symbol a 1/0 or a bit decision is made, that is it has to be decided whether a symbol represents 1 or 0. A common method for this decision is to slice the waveform, that is the sequence of symbols with a DC estimate (shown as line DC In FIG. 2 (*a*)) into decided but oversampled bits illustrated In FIG. 2 (*b*). That is, based on the DC estimate for each of the samples within one symbol, a separate bit decision is made. Then for each symbol one sample out of the oversampled bit stream is taken as the result of the actual 1/0 decision. For an optimum bit error rate performance under noisy conditions, the samples corresponding to the symbol phase with optimum signal to noise ratio (S/N) (—the so called golden samples—) have to be taken. FIG. 2 (*c*) shows the golden samples taken from the oversampled bit stream by appropriate sampling and the corresponding bits.

A DC estimate can be obtained by freezing the output of a low pass filter at an appropriate time Instant when a packet has been detected. The position of a golden sample is assumed to be in the symbol center and therefore can be directly derived from the symbol timing.

When data extraction has been started DC estimate and symbol timing estimate may be continuously corrected.

Further, in some known solutions a synchronization unit processes only already sliced bits, that is it receives the oversampled bit stream. In this case, DC estimation is done on the radio frequency RF side. However, different DC estimation methods (fast and slow adapting low pass filters) should be used for packet search and data extraction due to different performance requirements. Bit slicing after a false alarm (with a slow adapting low pass filter) is not necessarily correct and a valid packet may be missed therefore.

Consequently, receivers have to perform a tradeoff between the packet loss rate (packet not recognized) and the false alarm probability (erroneous indication of a packet). Some receivers simply switch from an unsynchronous scanning mode into a synchronous mode in case a packet has been detected. In case of a false alarm the detection of a valid packet is often blocked then until the false alarm is recognized on higher layers.

SUMMARY OF THE INVENTION

Thus, the present invention provides a method and a device for data extraction from a data stream containing at least one data packet that prevents data extraction from being blocked by false alarms.

According to the invention a method for data extraction from a data stream containing at least one data packet, comprises the steps of: comparing a bit stream derived from a received digital data stream with an expected bit sequence to determine a correlation value for detecting a data packet, starting data extraction when the correlation value exceeds a threshold value indicating that a data packet has been detected, continuing comparing the received bit stream with the expected bit sequence to determine a new correlation value, and restarting data extraction when the new correlation value exceeds the former correlation value.

The present invention makes it possible to highly improve data reception because the threshold value for the correlation value that is used to detect the data packet can be set relatively low, so that the packet loss rate can be kept so low that nearly no data packet is lost whereas false alarm does not lead to receiving invalid data. In a case that a data packet is erroneously detected while no valid data packet exists, a valid data packet will not be lost, since the data packet detection is continuously performed. Thus, in a case it is indicated that a data packet is received that is more likely a valid data packet since the correlation value is greater than that of the first data packet, data extraction is restarted. Therefore, a valid data packet will not be missed even if data extraction has already been started due to a false alarm.

To increase the reliability of data extraction according to the present invention, the threshold value is a programmable value. Therefore, the threshold value can be adapted to different operational conditions.

To simplify the decision whether a valid data packet has been detected after starting data extraction due to a prior data packet detection, it is provided that the correlation value is stored as a correlation value each time data extraction is started or restarted and the new correlation value continuously determined after starting or restarting data extraction is compared with the actually stored correlation value.

According to an advantageous refinement of the present invention data extracted prior to restarting data extraction is rejected, because data extracted before restart is apparently false data processed due to an earlier false alarm.

To further improve data extraction, an initial timing estimate is determined after detecting a data packet but prior to starting data extraction that synchronizes sampling of bits from a data stream for data extraction with data stream symbols. The instant when a packet is detected is only a rough timing information and the initial timing estimate further improves data extraction.

According to a preferred embodiment of the present invention, the timing of the sample process is continuously tracked by comparing the timing of symbols within the oversampled bitstream with the actual timing of the sample process and correcting the timing of the sample process if the deviation between the timing of the sample process and the timing of symbols exceeds a certain value.

According to another aspect of the invention the method for data extraction from a data stream containing at least one data packet is preferably performed by a device that comprises a data extraction unit for extracting data from a received data stream, a packet detector for comparing a bit stream derived from a received digital data stream with an expected bit sequence to determine a correlation value, and a sync-control module receiving the correlation value from the packet detector that controls the data extraction unit for starting data extraction when the correlation value exceeds a threshold value.

Due to the packet detector that can be operated independently from the data extraction unit, it is possible to continuously perform packet detection even if data extraction has already been started. Therefore it is possible to restart data extraction as required by the inventive method immediately when a new threshold value indicates that a data packet has been detected again, now with higher reliability.

The device further comprises an initial timing estimator which receives the data stream for determining an initial timing estimate prior to starting data extraction for synchronizing data extraction with data stream symbols, the initial timing estimate is output to the sync-control module.

The data extraction unit comprises a DC estimator deriving a DC estimate from the received data stream, a comparator for performing a bit decision on the data of the received data stream to derive an oversampled bit stream, the comparator has first and second inputs for receiving the DC estimate from the DC estimator and the data stream, respectively, and a sample-and-hold module for sampling the oversampled bit stream received from the comparator.

The data extraction unit further comprises a timing estimator receiving the oversampled bit stream output by the comparator for tracking the initial timing and for controlling the sample-and-hold module.

Since the data extraction unit comprises a timing estimator for continuously tracking the timing or synchronization, it is possible that the initial timing estimator can work in the same way as before after starting data extraction, so that in case that a further data packet has been detected with higher reliability restarting data extraction can be performed in the same way as starting data extraction at the first time.

BRIEF DESCRIPTION OF THE DRAWINGS

The present invention will be explained in more detail hereinafter with reference to the accompanying drawings showing preferred embodiments.

DETAILED DESCRIPTION OF THE INVENTION

Figure 1:
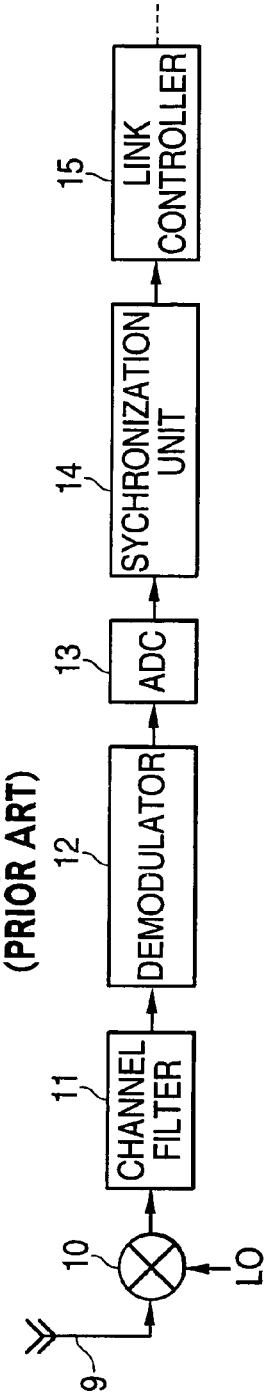
FIG. 1 shows a simplified block diagram of the receiving chain of a conventional prior art transceiver used for wireless communication.
Figure 3:
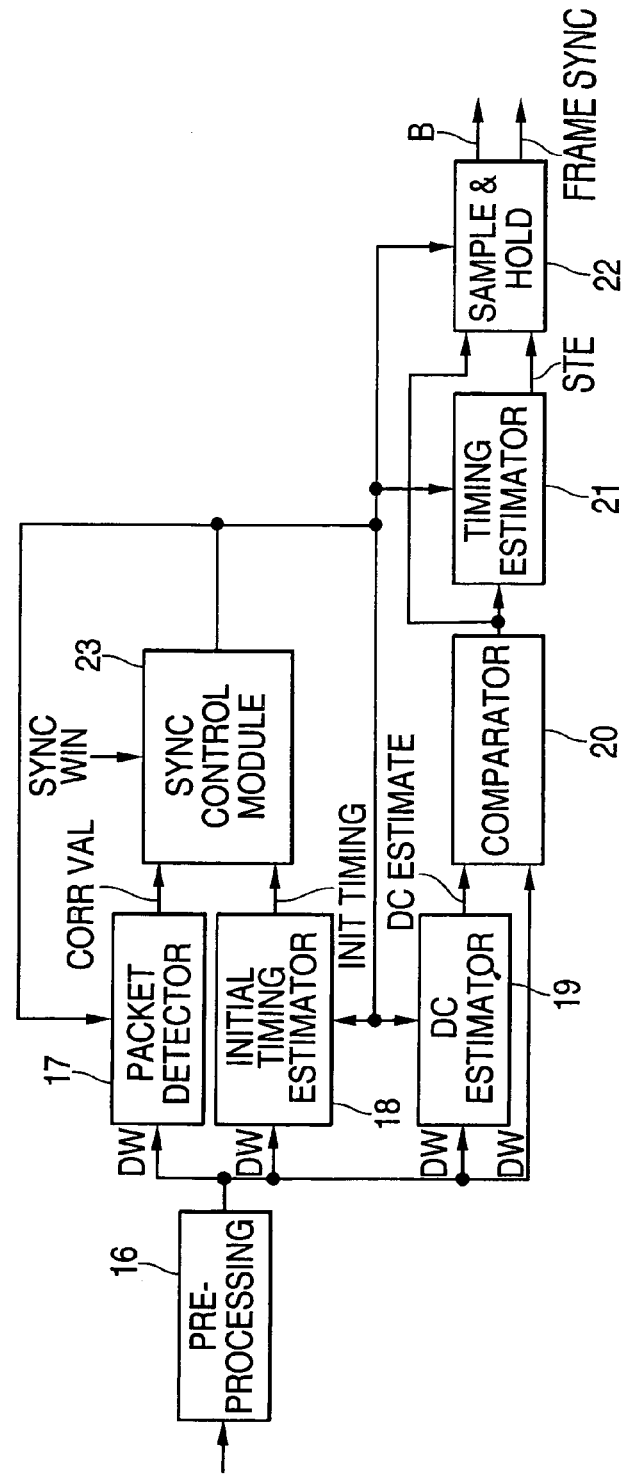
FIG. 3 is a simplified schematic block diagram of a device according to the present invention that can be used as synchronization unit.

The device for data extraction, for example a synchronization unit, according to the present invention is realized with a highly modular structure. As can be seen in FIG. 3 the main parts of the synchronization unit are a preprocessing module 16 that might contain ADC postprocessing or postdetection filtering of the demodulated signal, a packet detector 17 that scans the input signal, that is the digital representation of the demodulated waveform for valid access codes, an initial timing estimator 18 that provides an initial estimate of the symbol timing, a DC estimator 19 that generates initial as well as continuously tracked DC estimates for symbol slicing, a comparator 20 for symbol slicing, a timing estimator 21 for continuously tracking the symbol timing, a sample-and-hold module 22 that performs the downsampling, and a sync-control module 23 that controls all modules given above.

In general, the preprocessing module 16 might contain ADC postprocessing or postdetection filtering of the demodulated signal.

The preprocessing module 16 is responsible for postdetection low pass filtering used for optimizing the bit error rate under noisy and interfering conditions. The output is the low pass filtered digital waveform representation DW of the demodulated waveform W. The reprocessing module 16 is placed at the radio frequency/baseband (RF/BB) interface.

The packet detector 17 is responsible for indicating the presence of valid packets. The packet detector 17 gets the demodulated and filtered waveform signal DW as input and provides a correlation value CorrVal as output signal. The correlation value CorrVal indicates the degree of similarity between the bit sequence of the received waveform and an expected bit sequence.

A packet detector 17 for TDMA transceivers that can be used with the present invention is described in detail in the copending U.S. patent application Ser. No. 09/981,903, filed Oct. 19, 2001, entitled "METHOD AND DEVICE FOR IDENTIFYING A DATA PACKET IN A DATA STREAM", by M. Schetelig et al filed on the same day as the present application and claiming the priority of the German patent application DE 100 51 889, the disclosure of which is incorporated in this specification by reference. In this application the calculation or the estimation of the correlation value is explained.

The initial timing estimator 18 also processes the digital demodulated waveform signal DW. During a given search time, indicated by the sync-control module 23, the initial timing estimator 18 determines the accurate symbol timing. The initial symbol timing estimate is delivered to the sync-control module 23.

The DC estimator 19 performs two tasks. Again the digital demodulated waveform signal is processed. By selecting an appropriate sample of an internal low pass filter an initial DC estimate is generated. Afterwards this DC estimate is continuously tracked that is in ease of a DC drift resulting from a carrier frequency drift the DC estimate is continuously corrected. The DC estimate is supplied to the comparator 20 for symbol slicing.

Figure 2:
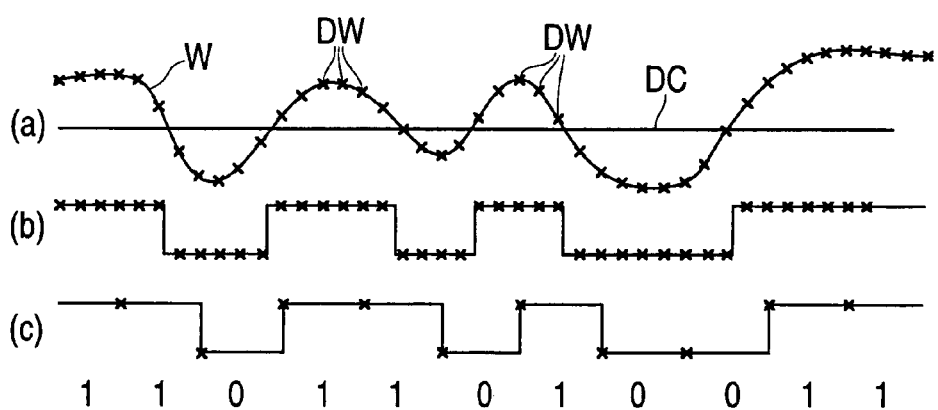
FIG. 2 shows different diagrams for (a) the demodulated waveform, the digitalized demodulated waveform and the DC level, (b) the oversampled bit stream and (c) the extracted bit data stream with the respective bits.

The comparator 20 simply compares the digital waveform signal DW with the DC estimate and performs the symbol slicing by providing the value 1 in case that the value of the waveform signal DW is greater than the DC estimate or the value 0 in ease that the value of the waveform signal DW is less than the DC estimate. Therefore, the output of the comparator 20 is an oversampled stream of bits as shown in FIG. 2b.

The timing estimator 21 continuously tracks the symbol timing estimate. It starts with an initial timing estimate that it gets from the sync-control module 23. The timing estimator 21 evaluates the edges of the demodulated waveform which are internally generated by processing the oversampled bit stream received from the comparator 20 and compares estimated timing and actual timing of the edges. The actual timing may be equal, early or late compared to the estimated timing. In a case there is a certain tendency towards either early or late, the estimated timing is corrected appropriately. The symbol timing estimate STE Is provided to the sample-and-hold module 22 as an output signal of the timing estimator 21. The symbol timing estimate STE can be actually formed by two signals, wherein the timing information is indirectly coded on them.

The sample-and-hold module 22 performs the downsampling by taking out the golden samples for the symbol decision. The sample-and-hold module 22 also provides the interface to the following circuits (not shown) which further process the extracted data on higher layers. Besides the extracted data B itself, a signal for indicating the data start (FrameSync) is needed also.

The sync-control module 23 controls the synchronization process. It is based on a state machine where the states correspond to the different phases of the synchronization process. With the SyncWin signal higher layers can indicate to the sync-control module 23 when a valid packet has to be expected. The output of the sync-control module 23 is the current state of the internal state machine. With the SyncWin signal the other modules of the synchronization unit are controlled.

Figure 4:
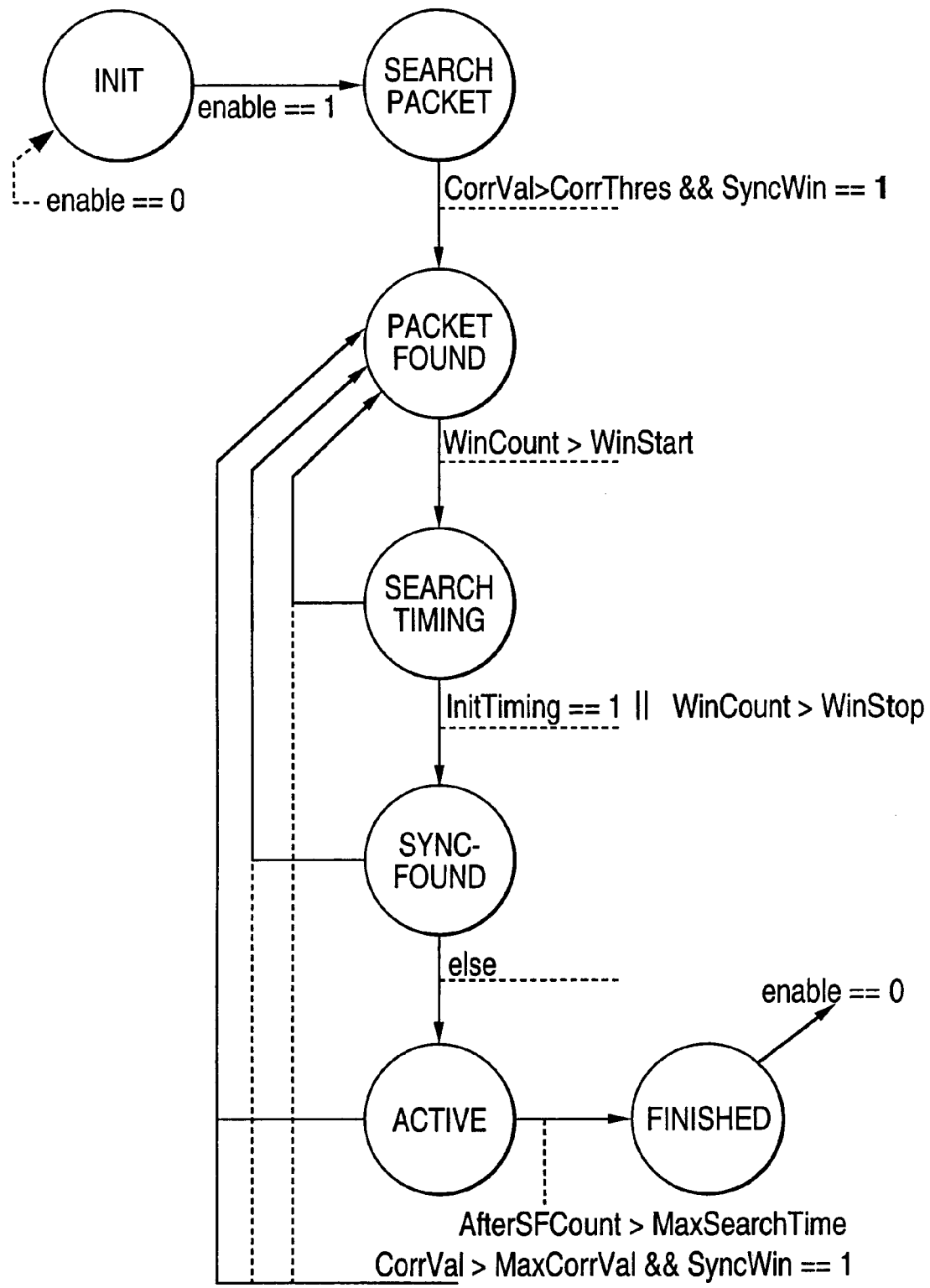
FIG. 4 is a simplified schematic diagram of a sync-control state machine used with the present invention.

A detailed description of the synchronization unit focussing on the sync-control state machine and the timing estimation will now be given with reference to FIG. 4.

The synchronization process can be split into different phases. These phases are represented by different states of the state machine inside the sync-control module 23. These phases are:

INIT: All modules are initialized to a well-defined startup state.

SEARCH PACKET: A valid packet is searched.

PACKET FOUND: A valid packet has been found.

SEARCH TIMING: The accurate symbol timing is searched.

SYNCFOUND: The symbol timing, that is synchronization, has been found.

ACTIVE: Data extraction is running, however the search for valid packets is still continued.

FINISHED: Data extraction is running until the synchronization unit is switched off, no packet search is done anymore.

When the synchronization unit is switched on, that is the clock is running but a signal enable is low, that is the signal enable equals 0, the state INIT is entered. Internal registers are reset to default or programmable values. The state INIT is left and the state SEARCH PACKET is entered when the enable signal is set to high, that is the enable signal equals 1.

By entering the state SEARCH PACKET, the packet detector 17 as well as the initial timing estimator 18 are enabled. The packet detector 17 delivers a correlation value CorrVal to the sync-control module 23 which indicates the degree of similarity between a bit stream of a received demodulated waveform and the expected access code or synchronization word. When CorrVal exceeds a programmable threshold CorrThres, the wanted packet is supposed to be found. In this case the state PACKET FOUND is entered in a case that the signal SyncWin is high or 1.

Always when the state PACKET FOUND is entered, the latest correlation value CorrVal is stored in a register MaxCorrVal of the sync-control module 23 (not shown).

Whenever a new correlation value CorrVal from the packet detector 17 exceeds the registered correlation value MaxCorrVal, while at the same time the state FINISHED has not been reached, while the signal SyncWin is high or 1, the state PACKET FOUND is reentered and MaxCorrval is set to the new value. The synchronization process can be restarted in the state PACKET FOUND. As a consequence, the synchronization unit can continue with scanning for access codes while data extraction is already prepared or even started. In a case the correlation value CorrVal indicates a higher level of confidence (higher correlation value CorrVal) compared to the last packet detection, the synchronization process is restarted. So far extracted data is rejected. Restarting of the synchronization process may be called multiple sync-found.

An advantage of multiple sync-founds is that the tradeoff between the false alarm rate and the packet detection performance under noisy conditions is eased, as always the best matching sequence can be detected. False alarms do not block the synchronization unit from detecting access codes received with sufficient signal quality. Normally false alarms do not reach the highest possible correlation value CorrVal levels.

The state PACKET FOUND can only be entered when a signal SyneWin is set to 1. Otherwise the result of the correlation value CorrVal evaluation is ignored. By means of the signal SyncWin higher layers can control the synchronization process. A well-defined time window for synchronization can be given as a consequence.

When the state PACKET FOUND is entered, the timing of the detected packet is already roughly known. However the inaccuracy is nearly ±1 symbol. As a consequence the Initial timing estimator 18 has to search for the accurate timing during one symbol period only. This allows an efficient implementation of the initial timing estimator 18.

The state PACKET FOUND is left when the search time for the initial symbol timing estimate starts. The search time starts a programmable time after the state PACKET FOUND has been entered. A counter WinCount is started when the state PACKET FOUND is entered. When the counter Win-Count value reaches the programmable value WinStart, the state SEARCH TIMING is entered.

The counter WinCount continues to run in the state SEARCH TIMING. The delay given by value WinStart between packet detection and start of the initial timing search is needed as the packet detector 17 and the initial timing estimator 18 trigger on different parts of the processed access code. The packet detector 17 triggers at the end of the synchronization word and the initial timing estimator 18 triggers at the end of the trailer bits of the received data packet.

In the state SEARCH TIMING the sync-control module 23 waits for the trigger signal InitTiming from the initial timing estimator 18. When the trigger signal InitTiming arrives, that is when the signal InitTiming equals 1 or when the counter WinCount reaches the programmable value WinStop, the state SYNC-FOUND is entered.

The state SYNCFOUND only lasts for one clock cycle. It indicates to the other modules that an access code with the accurate symbol timing has been found, that is that synchronization has been found. The timing estimator 21 and the sample-and-hold module 22 are initialized during the state SYNCFOUND. In these modules 21 and 22 modulo counters with a period corresponding to the symbol period are started then. The state SYNCFOUND is immediately left. Normally the state ACTIVE is entered. Except for the one condition that the counter CorrVal value exceeds the registered value MaxCorrVal while the signal SyncWin is set. In this ease the state PACKET FOUND is entered.

The state ACTIVE lasts for a programmable time MaxSearchTime. When it is entered the counter AfterSFCount is started. When this counter AfterSFCount value exceeds the programmable value MaxSearchTime, the state FINISHED is entered.

During the state ACTIVE as well as during the state FINISHED the data extraction is active. However during the state ACTIVE the synchronization process can be restarted under the known conditions bound to the values CorrVal, MaxCorrVal and SyncWin.

The state FINISHED is left when the synchronization unit 23 is disabled. In this case the state INIT is entered again when the signal enable is set high. Normally the synchronization unit 14 is switched off inbetween.

The synchronization unit 14 is not responsible for detecting the end of the user data. Higher layers have to stop the data evaluation at the appropriate time.

An advantage of the modular structure of the synchronization unit 14 according to the present invention is that the modules for packet detection and symbol timing estimation (packet detector 17, Initial timing estimator 21) can continue to work when the data extraction is already started.

For an optimum receiver performance in terms of bit error rate the most appropriate samples within the oversampled bit stream from symbol slicing—the so called golden samples—have to be used to represent the received bits.

The task of the timing estimator 21 is to set the sample time for the sample-and-hold circuit 22. After initialization the timing estimator 21 continuously corrects the sampling time. The main reason for the continued correction is to compensate for initial timing errors after synchronization. A second reason is to compensate for deviations between the transmitter and receiver bit clock.

The timing estimation is done with an edge detection procedure. That means that the edges of the oversampled data signal from symbol slicing are used to estimate the symbol timing. As the received and filtered symbols are symmetric, the so called golden samples are found in the center of each symbol. Due to the symmetry of the symbols, the edges are always positioned in the center between two symbols. Consequently the edges occur with a fixed phase of half a symbol relative to the golden samples.

The timing estimation is done in two steps. In the first step for each edge on the data signal from symbol slicing, that is the oversampled bit stream, the estimated timing of an expected edge is compared with the actual edge timing. The estimated timing of an expected edge can be generated by delaying the latest sampling trigger by half a symbol. The sampling triggers correspond to the estimated timing of the golden samples. The estimated timing of edges and the estimated timing of golden samples can be regarded as certain phases of the estimated symbol timing.

If the estimated edge timing appears to be early, an early-late-counter 31 value (cf. FIG. 5) is decremented. If it appears to be late, the early-late-counter 31 value is incremented. This is done for each actual edge that appears. When actual edges and estimated edges occur at the same time the early-late-counter 31 value is unchanged. Also when no actual edges occur due to a sequence of equal bits, the early-late-counter 31 will keep its value.

In the second step the early-late-counter 31 value is compared to a programmable threshold CorrectionThres. If the positive or negative value of the early-late-counter exceeds this threshold CorrectionThres the estimated symbol timing is appropriately corrected. With this threshold the adaptation speed of the timing estimation is controlled. After correction of the estimated symbol timing the early-late-counter 31 value is set to 0 again. The early-late-counter value is also set to 0 at initialization in the state SYNCFOUND.

Figure 5:
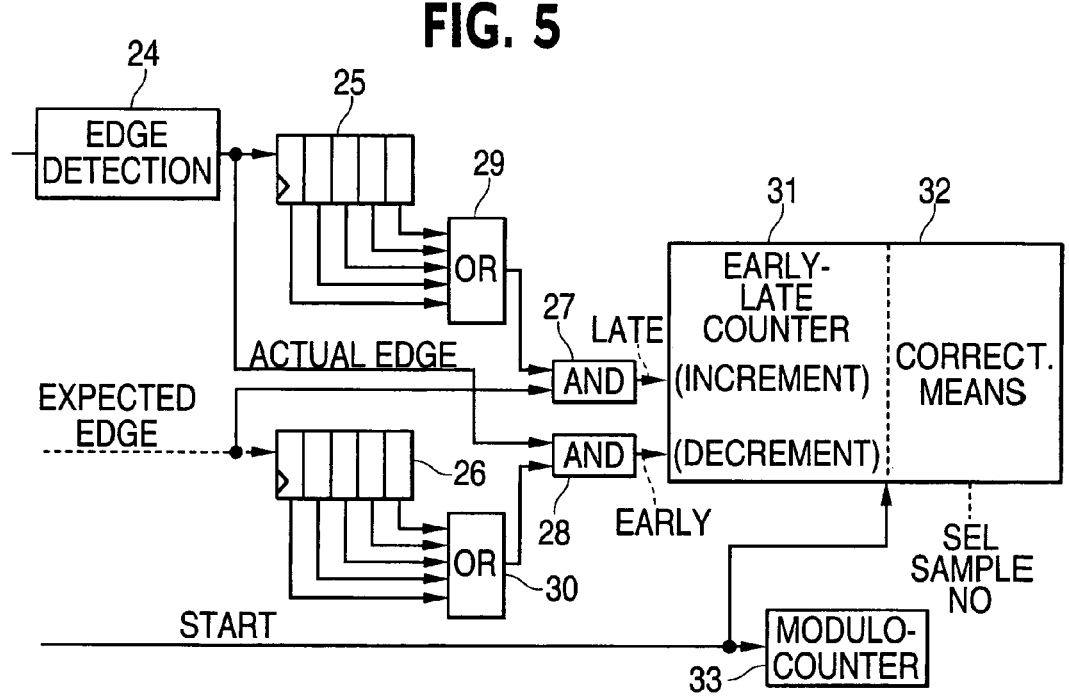
FIG. 5 is a simplified schematic block diagram of a timing estimator used in a data extraction unit of a synchronization unit according to the present invention.

FIG. 5 shows an example for an implementation of the timing estimation in the timing estimator 21.

The estimated edge timing is given with a signal ExpectedEdge that can be internally generated from the current symbol timing estimate, that is from the current golden sample timing estimate, by delaying the sample trigger by half a symbol as mentioned above. The bit stream from symbol slicing, that is the output signal of the comparator 20, is used in the timing estimator for generating the signal ActualEdge by performing edge detection on this signal.

The signal ExpectedEdge and a signal ActualEdge generated by an edge detector 24 are fed each into a tap delay line 25, 26 with a length of roughly half a symbol. The taps of each of the tap delay lines 25, 26 are respectively connected to first and second AND gates 27, 28 via respective OR gates 29, 30. The signal ActualEdge output by the edge detector 24 is fed to a second input of the second AND gate 28 the first input of which receives the output of the second OR gate 30 that is connected with the second tap delay line 26 receiving the signal ExpectedEdge. Similarly, the signal ExpectedEdge Is fed to a second input of the first AND gate 27 the first Input of which receives the output of the first OR gate 29 that is connected with the first tap delay line 25 receiving the signal ActualEdge.

By respectively comparing each one of the signals ActualEdge and Expected-Edge with the delayed taps of the other it is checked if one event (i.e. expected or actual edge) occurred before the other. If so, a corresponding trigger Early or Late is respectively set and the early-late-counter 31 is appropriately changed. Under normal operation ExpectedEdge and ActualEdge events occur at maximum only a few samples apart. In addition, ExpectedEdge and Actual-Edge events occur at most only once during a period of nearly one symbol.

When the early-late-counter 31 value exceeds the correction threshold CorrectionThres the estimated symbol timing is appropriately shifted one sample by incrementing or decrementing the signal SelSampleNo by correction means 32 associated with early-late-counter 31. That is, if early-late-counter 31 value Is less than the negative value of the threshold CorrectionThres, the signal SelSampleNo is incremented, whereas, when the early-late-counter 31 value is greater than the positive threshold CorrectionThres, the signal SelSampleNo is decremented. The early-late-counter 31 value is then reset to zero again.

The timing estimator 21 as well as the sample-and-hold circuit 22 are initialized in the state SYNCFOUND. The state SYNCFOUND occurs with a known fixed phase relative to the received demodulated waveform signal. SelSampleNo is a certain phase relative to a free running modulo counter 33 (period 1 symbol) which is initialized at the SYNCFOUND state. At initialization SelSampleNo is set to a well-defined value which represents the initially estimated timing of golden samples. As a consequence the current symbol timing estimate is given with the signal SelSampleNo.

The symbol timing estimate STE. i.e. the estimated timing of the golden samples is delivered to the sample-and-hold circuit 22 with two signals, that is the signal SelSampleNo and the output of counter 33. The free running modulo counter 33, is used as a reference time. The modulo counter 33 is started when the sync-control circuit 23 enters the state SYNCFOUND by a start signal Start. The second signal SelSampleNo determines the actual sampling time. When SelSampleNo and modulo counter 33 value are equal the sampling is triggered. When SelSampleNo is incremented by 1 the sample timing is delayed one sample. When SelSampleNo is decremented by 1 sampling takes place one sample earlier.

The purpose of the two-signal solution instead of one sampling trigger signal is to deliver besides the actual timing also information about the initial timing to the sample-and-hold circuit 22.

What is claimed is:

1. A method comprising:
   comparing a bit stream derived from a received digital data stream with an expected bit sequence to determine a correlation value for detecting a data packet;
   starting data extraction from the bit stream when the correlation value exceeds a threshold value to indicate that a data packet has been detected;
   storing the correlation value that exceeds the threshold value as a maximum correlation value for use as a new threshold value;
   continuing comparing the bit stream with the expected bit sequence during started data extraction to determine a new correlation value; and
   restarting data extraction from the bit stream when the new correlation value exceeds the stored maximum correlation value.

2. The method as claimed in claim 1, wherein the threshold value is a programmable value.

3. The method as claimed in claim 1, wherein the correlation value is stored as the maximum correlation value each time data extraction is started or restarted and the new correlation value continuously determined after starting or restarting data extraction is compared with the stored maximum correlation value.

4. The method as claimed in claim 1, wherein data extracted prior to restarting data extraction is rejected.

5. The method as claimed in claim 1, wherein after detecting a data packet an initial timing estimate is determined prior to starting data extraction that synchronizes sampling of bits from a data stream for data extraction with data stream symbols.

6. The method as claimed in claim 5, wherein timing of the sampling of bits is continuously tracked by comparing timing of symbols within an oversampled bitstream with actual timing of the sampling of bits and correcting the timing of the sampling of bits if a deviation between the timing of the sampling of bits and the timing of the symbols exceeds a value.

7. An apparatus comprising:
   a data extraction unit configured to extract data from a received data stream;
   a packet detector configured to compare a bit stream derived from a received digital data stream with an expected bit sequence to determine a correlation value for detecting a data packet, the packet detector comprising means for continuing to compare the received bit stream with the expected bit sequence during started data extraction to determine a new correlation value; and
   a sync-control circuit configured to receive the correlation value from the packet detector, the sync-control circuit configured to control the data extraction unit for starting or restarting data extraction from the bit stream when the correlation value exceeds a threshold value or a stored maximum correlation value indicating that a data packet has been detected, and configured to store the correlation value that exceeds the threshold value as a maximum correlation value for use as a new threshold value.

8. The apparatus as claimed in claim 7, wherein the apparatus comprises an initial timing estimator configured to receive the digital data stream and configured to determine an initial timing estimate prior to starting data extraction for synchronizing data extraction with data stream symbols, the initial timing estimate being output to the sync-control circuit.

9. The apparatus as claimed in claim 7, wherein the data extraction unit comprises a DC estimator configured to derive a DC estimate from the received data stream, a comparator configured to perform a bit decision on data of the received data stream to derive an oversampled bit stream, the comparator including first and second inputs configured to receive the DC estimate from the DC estimator and the data stream, respectively, and a sample-and-hold module configured to sample the oversampled bit stream received from the comparator.

10. The apparatus as claimed in claim 9, wherein the data extraction unit comprises a timing estimator configured to receive the oversampled bit stream output by the comparator for tracking the initial timing and for controlling the sample-and-hold module.

11. The method of claim 1 further comprising synchronizing the received bit stream based on the stored maximum correlation value.

12. The apparatus of claim 7 wherein the sync-control circuit further synchronizes the received data stream based on the stored maximum correlation value.

13. An apparatus comprising:
   a data extraction unit configured to extract data from a received data stream;

a packet detector configured to compare a bit stream derived from a received digital data stream with an expected bit sequence to determine a correlation value for detecting a data packet, the packet detector further configured to continue comparing the received bit stream with the expected bit sequence during started data extraction to determine a new correlation value; and a sync-control circuit configured to receive the correlation value from the packet detector, the sync-control circuit configured to control the data extraction unit for starting or restarting data extraction from the bit stream when the correlation value exceeds a threshold value or a stored maximum correlation value indicating that a data packet has been detected, and configured to store the correlation value that exceeds the threshold value as a maximum correlation value for use as a new threshold value.

14. The apparatus of claim 13 wherein the sync-control circuit is further configured to synchronize the received data stream based on the stored maximum correlation value.

15. The apparatus as claimed in claim 13, wherein the apparatus comprises an initial timing estimator which receives the digital data stream configured to determine an initial timing estimate prior to starting data extraction for synchronizing data extraction with data stream symbols, the initial timing estimate being output to the sync-control circuit.

16. The apparatus as claimed in claim 13, wherein the data extraction unit comprises a DC estimator configured to derive a DC estimate from the received data stream, a comparator configured to perform a bit decision on data of the received data stream to derive an oversampled bit stream, the comparator including first and second inputs for receiving the DC estimate from the DC estimator and the data stream, respectively, and a sample-and-hold module configured to sample the oversampled bit stream received from the comparator.

17. The apparatus as claimed in claim 16, wherein the data extraction unit comprises a timing estimator configured to receive the oversampled bit stream output by the comparator for tracking the initial timing and for controlling the sample-and-hold module.

* * * * *

UNITED STATES PATENT AND TRADEMARK OFFICE
CERTIFICATE OF CORRECTION

PATENT NO. : 7,646,831 B2  Page 1 of 1
APPLICATION NO. : 09/981795
DATED : January 12, 2010
INVENTOR(S) : Markus Schetelig et al.

It is certified that error appears in the above-identified patent and that said Letters Patent is hereby corrected as shown below:

In Title,
Please delete "Lease" and insert --Least--

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,646,831 B2  Page 1 of 1
APPLICATION NO. : 09/981795
DATED : January 12, 2010
INVENTOR(S) : Markus Schetelig et al.

It is certified that error appears in the above-identified patent and that said Letters Patent is hereby corrected as shown below:

Title Page, Item (54) and at Column 1, line 3, in Title,
Please delete "Lease" and insert --Least--

This certificate supersedes the Certificate of Correction issued June 1, 2010.

Signed and Sealed this

Twenty-ninth Day of June, 2010

David J. Kappos
*Director of the United States Patent and Trademark Office*